United States Patent

Pei

[11] Patent Number: 5,906,176
[45] Date of Patent: May 25, 1999

[54] COMBINATION FISH TANK AND FIRE EXTINGUISHER

[76] Inventor: Jainn-Nan Pei, No. 32-1 Ming-Der St. Liou-Tsuoh Tsuen, Hua-Tarn Shiang Chang Hwa Hsien, Taiwan

[21] Appl. No.: 08/977,499

[22] Filed: Nov. 24, 1997

[51] Int. Cl.[6] ..................................................... A01K 63/00
[52] U.S. Cl. ........................... 119/247; 119/253; 119/259; 169/5; 169/54
[58] Field of Search ..................................... 119/247, 253, 119/259, 265, 245; 169/5, 13, 16, 54; 137/355.17, 355.26

[56] References Cited

U.S. PATENT DOCUMENTS 3,958,594  5/1976  Masters ............................... 137/355.17
5,113,944  5/1992  Nakagawa et al. ....................... 169/13

Primary Examiner—Michael J. Carone
Assistant Examiner—James S. Bergin
Attorney, Agent, or Firm—Bacon & Thomas

[57] ABSTRACT

A combination fish tank and fire extinguisher including a container having a manually operated pump mounted on the top and a motor housing supporting the bottom. Installed inside the motor housing is a water pump motor, a storage battery and an electric power switch, such that in the event of fire, water can be pumped out of the container by the electric motor or by the manually operated pump to extinguish flames, or by using both the electric motor and the manual pump simultaneously. Furthermore, a filter element box is utilized to cultivate aquatic species when the container serves as a fish tank.

1 Claim, 3 Drawing Sheets

COMBINATION FISH TANK AND FIRE EXTINGUISHER

BACKGROUND OF THE INVENTION

The frequency of fire outbreak is massively destructive to life and property. Greatly feared by all, there are four classes of fire: Class A, Class B, Class C and Class D. However, fires have no sympathy and no matter what the specific class, if fires are not effectively controlled at the starting point and permitted to spread, all forms of life and property will be burned and obliterated. For this reason, firefighters and related public agencies often announce in the media that "Fire prevention is everyone's responsibility, being prepared saves lives." There are a number of methods to keep fires from spreading such as covering, dousing with water, beating the flames and hosing water, etc. In the case of foam-filled fire extinguishers, since utilization requires knowledge of certain procedures and the operation only lasts seconds, plus there are placement problems, year expiration limits, insufficient distribution and other difficulties, so effective utilization is seldom achieved. The inability to have such fire extinguishers at sufficient locations is a leading problem that lowers their effectiveness. However, aquariums or fish tanks are found in virtually every household and company, indicating that such products are widespread. In other words, there are more fish tanks than foam-filled fire extinguishers, as has been frequently stated by fire fighting agencies. In view of this situation, the inventor of the invention herein surmised that the ubiquitous fish tanks could also serve as fire extinguishers, wherein the fish tanks could be utilized to cultivate fish in normal situations and be converted to large-scale fire extinguishers during emergencies. Furthermore, the device could be equipped with both a manually operated pump and an electric-powered water pump to allow easier use by people of all ages to achieve the combined functions of both a fish tank and a fire extinguisher.

To enable the examination committee to further understand how the invention herein achieves the foregoing functions as well as the relevant structural and technological methods involved, the brief description of the drawings is provided below and is followed by the detailed description of the invention.

PARTS OF THE DRAWINGS

| PARTS OF THE DRAWINGS | |
| --- | --- |
| (1) Decorative cover. | (2) Manually operared pump. |
| (3) Container | |
| (4) Motor housing. | (20) Circular plate. |
| (30) Perforated round tube. | |
| (40) Water pump motor. | (21) Suction tube. |
| (31) Screen filter hole. | |
| (41) Storage battery. | (22) Filter element box. |
| (200) (201) Round hole. | |
| (43) Electric power switch key. | (44) Motor power switch key. |
| (45) Mains power plug. | (46) (47) Water hose. |

DETAILED DESCRIPTION OF THE INVENTION

Figure 1:
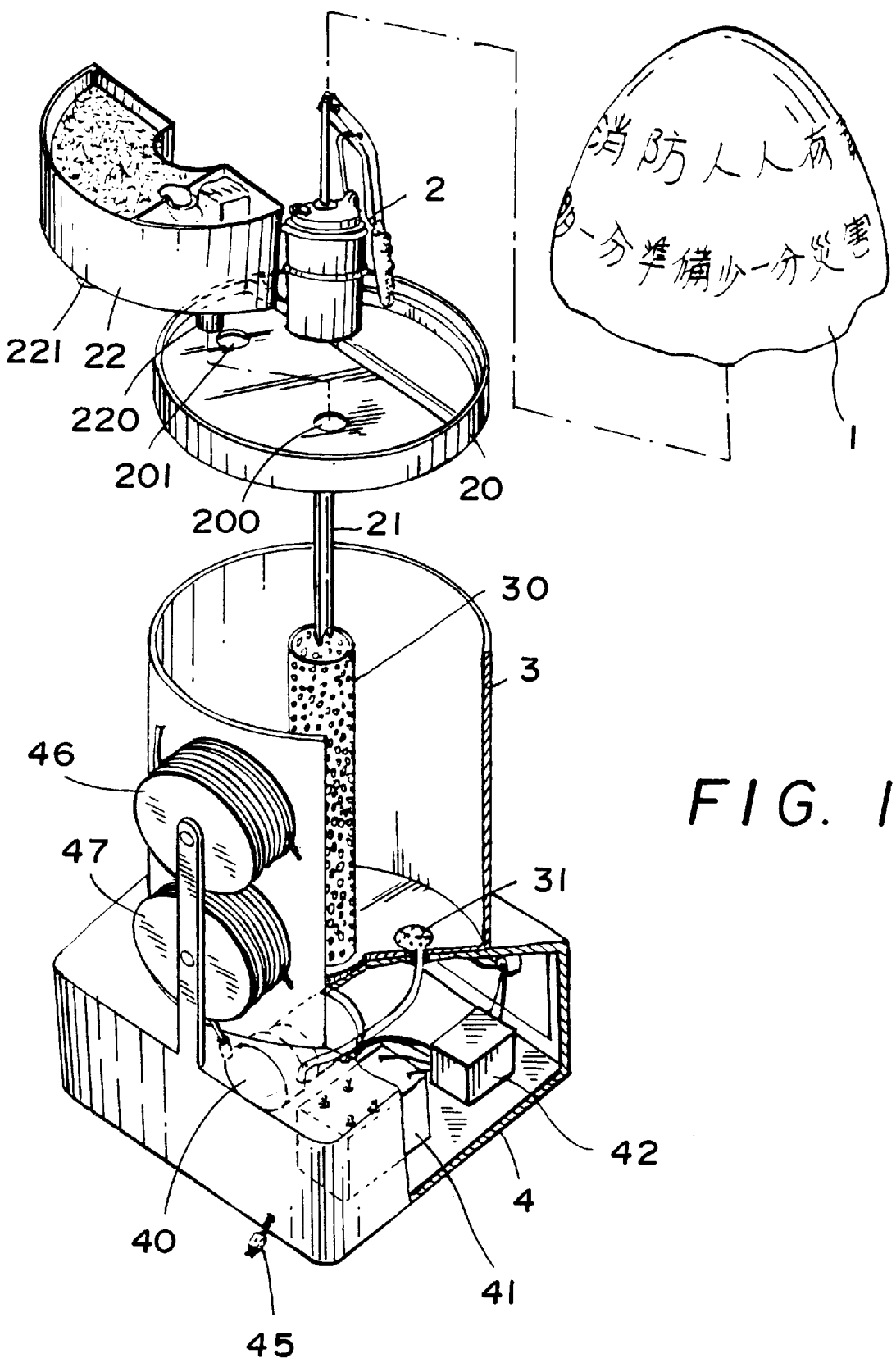
FIG. 1 is an exploded perspective view of the invention herein.

Referring first to FIG. 1 the invention herein is a combination fish tank and fire extinguisher that is mainly comprised of:

A decorative cover (1) that mainly serves to protect the manually operated pump (2) from dust and normally serves as an area for the application of decorative effects or printed characters.

Figure 2:
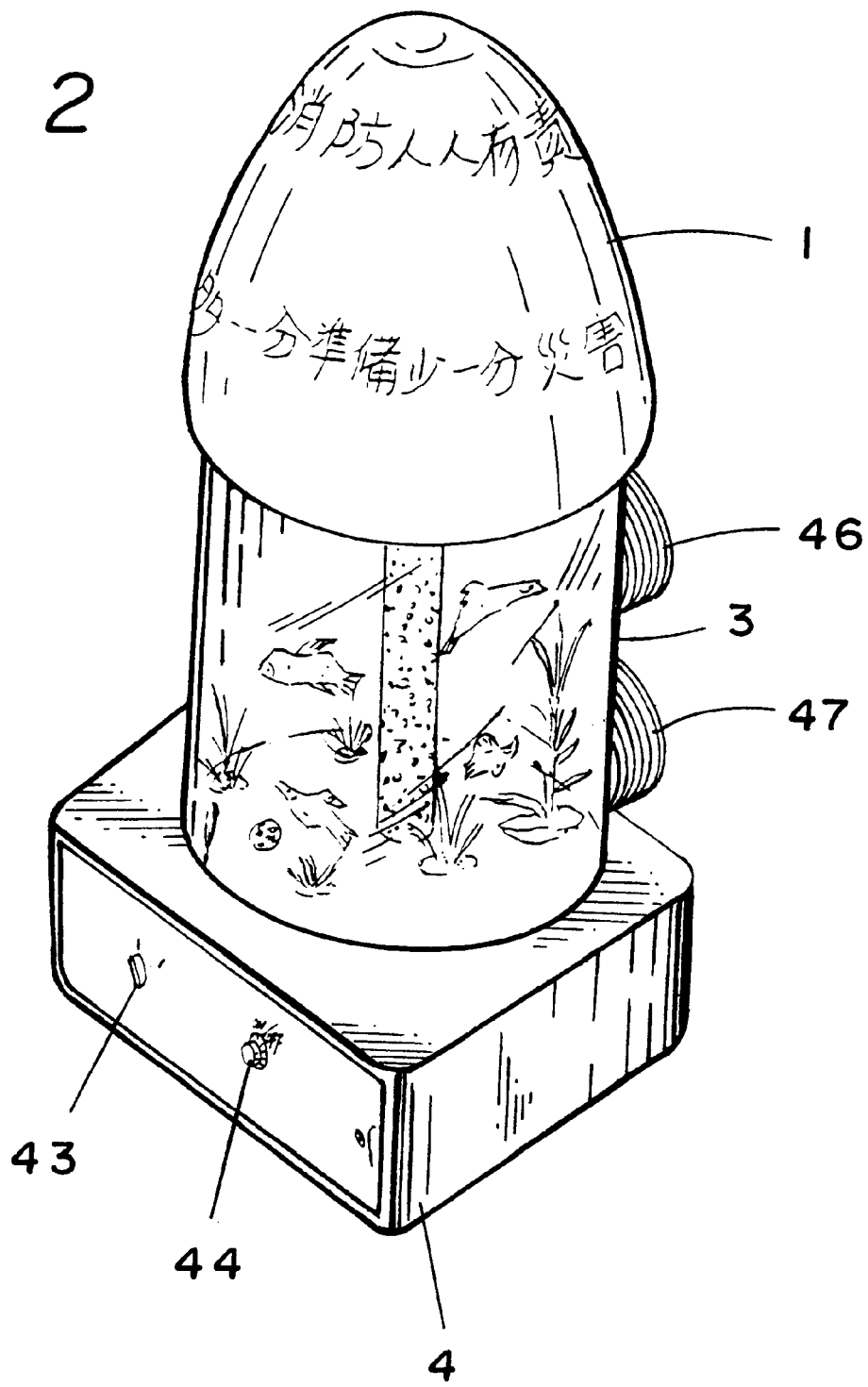
FIG. 2 is a perspective view of the invention herein when utilized as a fish tank.

A manually operated pump (2) that is a conventional hand-operated pump, the handle of which is moved up and down to evacuate water to be hosed. At the lower extent is a circular plate (20) and a suction tube (21) that function as the top cover of the container (3) and for the pumping of water, respectively. There are two round holes (200) and (201) in the circular plate and above the two round holes (200) and (201) is an area that holds the filter element and small motor of the filter element box (22), and the pump motor suction tube (220) and the filter element discharge tube (221) are respectively inserted into the aforesaid two round holes (200) and (201) of the aforesaid filter element box (22) and are normally utilized for filtering water lived in by aquatic species, with the eternal appearance shown in FIG. 2.

A container (3) that is constructed of a transparent material and has positioned at the center a perforated round tube (30) into which is inserted the suction tube (21) of the manually operated pumper (2) and positioned to the side of the perforated round tube (30) is a screen filter hole (31) that is contiguous to the tube of the pump motor.

Figure 3:
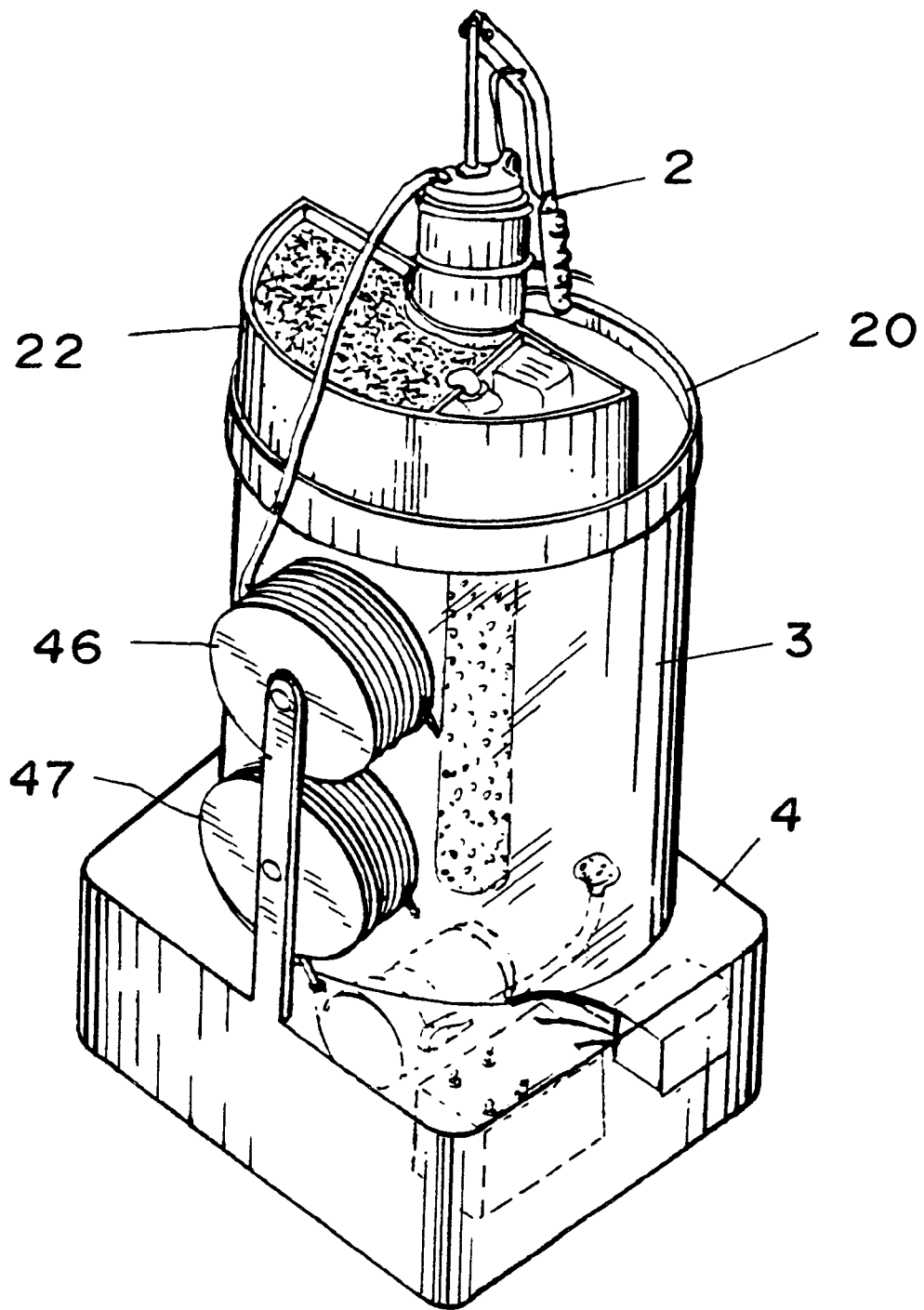
FIG. 3 is a perspective view of the invention herein when utilized as a fire extinguisher.

A motor housing (4) that is utilized to support the container (3) and installed inside is the water pump motor (40) and a storage batters (41) as well as an electric power switch (42). On the exterior of the aforesaid housing is an electric power switch key (43), a motor power switch key (44) and a main power plug (45) that controls the electric power to the motor (40) and, furthermore, supplies two types of electric power to the motor (40) for utilization under emergency conditions (for example, electricity is supplied by the storage pattern during mains power outages.) Furthermore there are two water hoses (46) and (47) coiled on the aforesaid housing and the aforesaid water hoses (46) and (47) are respectively connected to the output port of the manually operated pump (2) and the output port of the water pump motor (40) and, as indicated in FIG. 3. Both of the aforesaid hoses can be rapidly pulled out to extinguish flames in the event of a fire.

On the container (3) of the combination fish tank and fire extinguisher of the invention herein is a manually operated pump (2) and the motor housing (4) supporting the container (3) has an internally mounted motor (40) and a storage battery (41). The invention herein normally serves to facilitate the cultivation of the observed aquatic species inside the fish tank, but in the event of a fire. The invention herein can immediately become an extremely excellent and most effective fire extinguishing device that is capable of achieving the combined functional objectives of both a fish tank and a fire extinguisher.

In summation of the foregoing description, the ingeniously configured and assembled yet simple structure of the invention herein has the combined functions and features of both a fish tank and a fire extinguisher.

What is claimed is:

1. A combination fish tank and fire extinguisher comprising:
   a) a motor housing;
   b) a transparent container positioned on the motor housing for containing water, the container including a perforated round tube disposed at a center thereof and a screen filter hole;
   c) an electric motor pump, a storage battery and an electric power switch disposed within the motor housing, an electric power switch key and a motor power switch key disposed on an exterior of the motor housing, a main power plug for supplying electric power to the electric motor pump, the electric motor pump including a pump tube connected with the screen filter hole of the transparent container;

d) a circular plate covering a top of the transparent container, a manually operated pump and a filter element box positioned on the circular plate, the manually operated pump including a suction tube inserted within the perforated round tube and an output port, a decorative cover installed over the manually operated pump;

e) a pair of coiled water hoses on the motor housing, one water hose connected to the output port of the manually operated pump and the other water hose connected to the electric motor pump; and f) whereby through selective activation of the electric power and motor power switch keys, water may be pumped from the container through activation of either the manually operated pump or the electric motor pump.

\* \* \* \* \*